Figure 1:
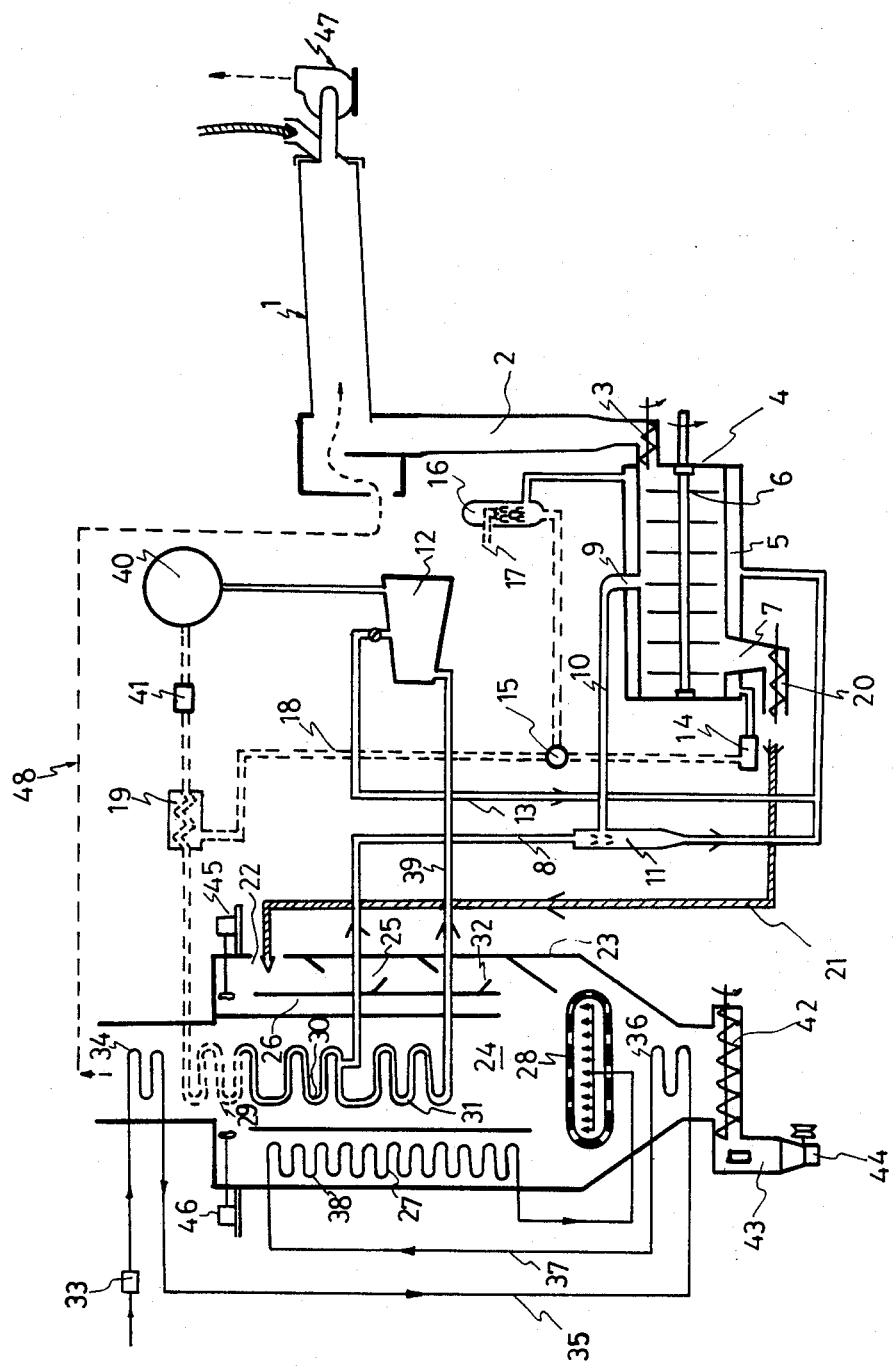

United States Patent [19]

Kuo

[11] Patent Number: 4,516,511
[45] Date of Patent: May 14, 1985

[54] REFUSE INCINERATION SYSTEM

[76] Inventor: Tsung H. Kuo, 465 Yuong An St., Cha-Yi, Taiwan

[21] Appl. No.: 597,256

[22] Filed: Apr. 6, 1984

[51] Int. Cl.³ .............................................. F23G 5/04
[52] U.S. Cl. .................................. 110/346; 110/224; 110/226; 110/227; 110/228; 110/234; 122/2
[58] Field of Search ................... 122/2; 110/234, 224, 110/225, 226, 227, 228, 238, 346

[56] References Cited

U.S. PATENT DOCUMENTS

| 2,148,447 | 2/1939 | Dundas et al. | 110/224 X |
| 4,091,748 | 5/1978 | Mansfield | 110/228 |
| 4,186,668 | 2/1980 | Tabel | 110/224 X |

Primary Examiner—Edward G. Favors

[57] ABSTRACT

In an improved refuse incineration system, wet refuse is heated in a dryer (4) to remove most moisture therefrom while converting such moisture into steam for use in order to save energy consumption in a steam generating plant. The dried refuse is then fed into a boiler (23) for combustion where, because it has been dried, the combustion gas temperature within the boiler is greatly increased and thus the thermal efficiency improved.

The preferred form of the system includes additional devices (27, 38) for preheating air used to support combustion of refuse enhancing the extent of combustion of combustible matter in the refuse. The preferred system also including devices (34, 29) for increasing the recovery of residual heat content from the waste stack gas.

10 Claims, 1 Drawing Figure

REFUSE INCINERATION SYSTEM

DESCRIPTION OF INVENTION

This invention relates to a method of refuse incineration and to a refuse incineration system such as may be used for incineration of wet municipal refuse in order to increase the thermal efficiency to produce greater mechanical work.

In a conventional incinerator, wet refuse is directly fed into a boiler without removing the great quantity of moisture contained in the refuse. In this case, the gaseous combustion product will entrain a great amount of steam with considerable latent heat which heat is lost when the combustion product is discharged from the chimney as stack gas. Furthermore, the wet refuse burns less rapidly than would dry refuse and requires a greater excess of air than would dry refuse, and thus there results a lower combustion gas temperature than would result from burning dry refuse. It is thus possible to generate, by means of such an incinerator only low temperature and low pressure steam which provides a lower conversion ratio of thermal energy to mechanical work. Furthermore, the fraction of the combustible matter in the refuse which remains unburnt is thus higher.

Although the wet refuse has no initial cost, the investment in the facilities for converting the thermal energy in such refuse into mechanical work is much more than in the case of a general high-temperature, high-pressure steam turbine power plant, and thus consequently it is scarcely profitable to generate power by the combustion of wet refuse. Nevertheless, shortage of energy and the disposal of municipal refuse are still both very troublesome problems.

Therefore, a primary object of this invention is to provide an improved incineration system whereby wet municipal refuse can be burnt economically to produce useful power.

According to the invention there is provided a method of refuse incineration including the step of drying the refuse before passing the latter to a boiler adapted to generate high-pressure superheated steam for producing mechanical work, wherein, in said drying step, the refuse is heated in a dryer by a heating medium in order to vaporise most of the moisture contained in said refuse.

Thus, in embodiments of the invention, the wet refuse is heated to remove the moisture as steam before the refuse is fed into the boiler for combustion so as to obtain an improved conversion ratio from thermal energy of wet refuse to mechanical work as compared to conventional systems. The wet refuse after drying increases its lower heating value which, in turn, decreases the heat loss of the stack gas and increases the proportion of combustible matter actually burnt. Thus the heat made available for heating the steam to perform work greatly increases and the heat loss caused by additional drying procedures is limited. Therefore, the favourable advantage of this invention is apparent. On the other hand, because the heating value increases upon the wet refuse being dried, the steam content of the combustion gas and excess air needed decrease, and in turn the combustion gas temperature is substantially raised to increase the thermal efficiency of steam work cycle.

In a preferred embodiment of the invention, the refuse after removal of most moisture is further dried by means of a stream of boiler combustion gas. As a result the excess air ratio needed during the refuse combustion is further reduced and the combustion gas temperature further raised, so that the combustion of combustible matter is more complete. This is quite different from the stack gas return utilised in conventional boilers, for the latter, by contrast, reduces the combustion gas temeprature.

Preferably, the air used to support combustion of the refuse is preheated by stack gas, ash and high temperature combustion gas to a temperature higher than the ignition point of the refuse which greatly raises the combustion gas temperature and enhances the complete combustion of the refuse.

Preferably the wet refuse is preheated by the waste stack gas before being heated in the dryer to remove most moisture content for further recovery of the waste heat of the stack gas.

The aforementioned and other objects and features will be more apparent from the following description with reference to the sole accompanying drawing which is a schematic flow diagram of an improved incineration system embodying the present invention.

The drawing shows a flow diagram of a refuse incineration system embodying the present invention, in which the wet refuse, after conventional pre-treatment, such as crushing, magnetic separation and the like, is fed through a rotary drum 1 into a refuse receptacle 2, and then squeezed therefrom by means of screw conveyor 3 into a continuous agitating dryer 4 provided with a heating jacket 5. The refuse is transported slowly through dryer 4 in the direction towards the outlet 7 and agitated, by rake agitation blade 6. In dryer 4 the refuse, and the moisture therein, is heated by steam at a pressure of about 20 psia in the jacket 5, and this moisture is vaporised as steam which is collected at vent 9 and introduced through line 10 into a thermal compressor 11 installed in a high-pressure steam line 8 extending from a high-pressure steam generator in the boiler, referred hereinafter. The steam from vent 9 is compressed by compressor 11 and is combined with the high-pressure steam from the compressor 11 and, optionally, with steam from an appropriate stage of a steam engine 12 such as a turbine, supplied via line 13, to be supplied to the jacket 5 for heating further refuse. The heating medium in jacket 5 is condensed after heating the wet refuse within the dryer 4 and the condensate is discharged by a trap 14 and sent into a hot water tank 15. The uncondensable gas, such as air and the like, in steam jacket 5 of said dryer 4, is vented, with some steam, into an absorber 16 to ensure the dryer 4 retains good thermal conductivity. The steam entrained by said uncondensable gas and the heat therein is absorbed in said absorber 16 by cold water coming from line 17 to recover latent heat from said steam and heat from said gas, to form hot water. This hot water is combined with the condensate in tank 15 and then introduced via line 18 into a heater 19 where it is used for heating up the boiler feed water. The refuse after being dried in the dryer 4 is sent out by a screw conveyor 20 through an enclosed and insulated conveyor, indicated by line 21, into the inlet 22 of the boiler 23.

The boiler 23 comprises a combustion chamber 24, a drying chamber 25, a drying gas return chamber 26 and a heating chamber 27 for pre-heating air to be used to support combustion of the refuse. At the bottom of said boiler 23 is provided a rotating burning grate 28. Inside the combustion chamber 24 is provided a feed water heater 29, a high-pressure steam generator 30 and a high-pressure superheated steam heater 31 connected in series in this order, the heater 29 being disposed above generator 30 which in turn is disposed above heater 31. The refuse sent into the inlet 22 drops by gravity along inclined buffer plates 32 provided inside of the drying chamber 25 and spaced apart in the vertical direction, and contacts, in counter-current, high-temperature combustion gas is rising through the drying chamber 25. Thereby, the residual moisture in the refuse is vaporised at last and the refuse becomes almost fully dried inflammable matter and, finally, drips on the grate 28.

On the other hand, the air to be used to support combustion is sent by a blower 33 into a stack air preheater 34 and preheated herein by exiting stack gas, then flows through line 35 into an ash air preheater 36 and is additionally preheated by the ash heat to about 200° C., and further flows through line 37 into a high-temperature air heater 38 in said heating chamber 27. After being heated by said three heaters 34, 36 and 38, the air has a temperature above the ignition point of refuse, generally about 450° C., and subsequently enters the rotating grate 28 for burning the dried refuse.

The refuse is thus burnt in the combustion chamber 24 and the high-temperature combustion gas thereby produced rises and passes through the high-pressure superheated steam heater 31, high-pressure steam generator 30 and feed water heater 29 successively to produce high-pressure super-heated steam which is sent via line 39 into the steam turbine 12 to do expansion work in a manner known per se in the art. After expansion in the course of doing such work, the waste steam is discharged into a condenser 40 to form condensate which is compressed by means of a high-pressure pump 41 and passes through the heater 19 into the boiler 23 for recycle use.

The combustion gas carries out heat exchange to the apparatus 31, 30 and 29 and consequently its temperature is reduced and it becomes stack gas which passes air preheater 34 which recovers further residual heat from the gas, then the gas vents to the atmosphere after being subjected to conventional treatment, such as electrostatic dust collection, harmful gas absorption and the like. The residual ash on the grate 28 is collected at the conical bottom of the boiler to heat the air in the ash air preheater 36 with its residual heat. The ash is finally discharged by means of the screw conveyor 42 into ash receptable 43 and blows down through the ash outlet 44 periodically or as desired.

For further enhancing the performance of the incineration, there may be various modifications. For example, in a first modification at the top of the drying chamber 25 a draft fan 45 may be provided for forcing the high-temperature combustion gas from the combustion chamber 24 to rise up through the drying chamber 25 and thus promote its drying action while contacting with the incoming refuse, also to increase the temperature of the almost dried refuse and in turn to increase the burning effect of the refuse when it reaches the grate 28. The rising combustion gas for drying the refuse returns to the combustion chamber 24 via drying gas return chamber 26.

In a second modification at the top of the heating chamber 27 another draft fan 46 may additionally be provided for similarly forcing the high-temperature combustion gas from the combustion chamber 24 to rise up through the gas heating chamber 27 and thus promoting the air preheating effect carried out by the preheater 38.

In a third modification, the stack gas exiting from the air preheater 34 may be caused by a draft fan 47 to pass through a line 48 into the rotary drum 1 for contacting with the wet refuse in counter-current. This is to recover further the residual heat in the stack gas and to preheat the wet refuse.

The modifications mentioned above may be realised individually or in combination of two or more.

In start-up of the incineration system described, an oil or gas burner may be used as in a conventional system. Furthermore, a solar energy collector may be used to generate necessary heat for heating medium used in the jacket 5 of the dryer 4. In this case, energy will be further greatly saved and power generation correspondingly increased.

The performance and advantages of the improved incineration system described with reference to the drawing are further illustrated by the following examples and comparative example.

COMPARATIVE EXAMPLE

A fact well known is that, during the combustion of refuse, the higher the lower heating value (LHV), the lower the proportion of combustible matter unburnt, and the lower the heat loss in stack gas and slag, then the greater is the heat available for generating steam. Furthermore, as the combustion gas temperature rises the thermal efficiency of the steam engine or turbine used to generate power can also be higher. With regard to a modern power plant, when burning fuel oil the combustion gas temperature is about 1550° C. (2800° F.) and the thermal efficiency for a steam cycle is up to 44.7%, while when burning wet refuse, the combustion gas temperature is about 850° C. and the thermal efficiency for a steam cycle is only around 20%.

Now, in an incineration plant for the treatment of 600 tons of Taipei municipal combined refuse containing 29% of combustible matter, 56% of moisture and 15% of ash and having LHV of 1,182 Kcal/kg using on established Japanese continuous incinerator, the proportion of combustible matter left unburnt is about 7% excess air ratio is about 2.0, and the heat loss by radiation from the boiler is 2%. For each kilogram of refuse burnt there is a heat loss, from stack gas exiting the boiler at 280° C., of 330 Kcal, and heat loss from ash, exiting the boiler at 200° C., of 6 Kcal, so that the net heat available for generating steam will be 741 Kcal. Combustion gas temperature is 925° C., thermal efficiency for the steam cycle is about 22.5% and 0.1940 KWH of power is generated. Therefore, this plant produces power in total of 4850 KW.

EXAMPLE 1

In a system according to the preferred embodiment of the present invention described, without the modifications referred to, the steam as vaporised from the refuse in the dryer is used as primary heating medium to remove moisture content in amount to 0.21 Kg/kg wet refuse. The heat loss by radiation from the boiler during combustion as well as the temperature of stack gas and ash exiting the boiler are the same as in the Comparative Example, but LHV increases to 1308 Kcal, the proportion of combustible matter left unburnt decreases to 2.5% excess air ratio required is about 1.7, the heat loss from stack gas and ash is 268 Kcal/kg and 6 Kcal/kg, respectively, make-up heat energy for the operation of the dryer having thermal efficiency of 75% is 118 Kcal/kg, but input heat from dried refuse is 32 Kcal/kg, the heat actually used for generating steam for the steam cycle will be 890 Kcal/kg refuse. The combustion gas temperature is 1240° C. and thermal efficiency for steam cycle is bout 34%, so that each kilogram of wet refuse will generate power of 0.3519 KWH. An incinerator for treating 600 tons of refuse per day will produce power of 8800 KW. Subtracting the 320 KW of power consumption for the agitation in the dryer, then net power production is 8480 KW.

EXAMPLE 2

In a system corresponding to that of Example 1 according to the essential embodiment but also including the first modification referred to above the moisture content of 56% of the wet refuse is reduced to 35% by the dryer (4) and further reduced to 15% in drying chamber (25) by the operation of the draft fan (45) before the refuse is dropped onto the grate (28) for burning. The proportion of combustible matter left unburnt decreases to 1.9%, excess air ratio is 1.5, the heat loss per kg refuse from stack gas is 246 Kcal, and other conditions are the same as in Example 1. In this case the heat available for generating steam cycle is 919 Kcal/kg. Furthermore, the combustion gas temperature is as high as 1320° C., the thermal efficiency for steam cycle is up to 36% so that each kilogram of wet refuse generates 0.3847 KWH. An incinerator for treating 600 tons of refuse per day will then produce 9,620 KW power. Subtracting 320 KW of power consumption for agitation in the dryer and neglecting consumption in other stages due to the pressure drops of combustion gas, (approximately 10 mm H2O for overcoming the resistances in the drying chamber and slight reverse flow rate of the combustion gas), then net power production is 9,300 KW.

EXAMPLE 3

In a system corresponding to that of Example 2, with the addition of the second modification referred to above, the draft fan (46) is provided and operated for raising the temperature of the air as combustion supporting gas in the heating chamber 27 from 200° C. to 450° C. During combustion, the proportion of combustible matter left unburnt decreases substantially to zero. Other conditions being as defined in Example 2, the heat available for generating steam in the steam cycle is 944 Kcal/kg. The combustion gas temperature is up to 1455° C. and the thermal efficiency for the steam cycle is about 41%. An incinerator of 600 tons capacity will produce power of 11,250 KW. Subtracting 320 KW of power consumption for the agitation of the dryer and 120 KW of power consumption for additional preheating of air by combustion gas including 100 KW for air draft and 20 KW for the blower for the air for supporting combustion, then net power production is 10,810 KW.

EXAMPLE 4

In a system corresponding to that of Example 3 with the addition of the third modification referred to above, the waste stack gas is introduced to drum 1 to preheat the wet refuse being fed therealong and to reduce the stack gas temperature to below 80° C. before it passes from drum 1 to be treated by the electrostatic dust collector and discarded through the chimney. The recovery of heat is about 134 Kcal/kg refuse. Other conditions are as defined in Example 3. The heat available for generating steam cycle is up to 1,078 Kcal/kg which will produce power about 12,850 KW. Subtracting a power consumption 320 KW for the agitation of the dryger, 120 KW for preheating the air by combustion gas and 340 KW for preheating the wet refuse by waste stack gas including 160 KW for preheater and 180 KW for draft fan, then net power production is 12,070 KW.

EXAMPLE 5

Repeating Examples 1 to 4 but utilising the steam generated by a solar energy collector as heating medium in the dryer, but with all other conditions substantially the same as defined in Examples 1 to 4, respectively, (the net power production is 10,900 KW, 11,860 KW, 13,700 KW and 14,990 KW respectively.

I claim:

1. A method of refuse incineration comprising the step of drying wet refuse before passing the latter to a boiler adapted to generate high-pressure superheated steam for producing mechanical work in an expander, wherein, in said drying step, the wet refuse is heated in a dryer by a heating medium in order to vaporize most of the moisture contained in said wet refuse to produce vapor, and recovering said vapoer and confining it into said heating medium.

2. A method of refuse incineration comprising the step of drying wet refuse before passing the latter to a boiler adapted to generate high-pressure superheated steam for producing mechanical work in an expander, wherein, in said drying step, the wet refuse is heated in a dryer by a heating medium in order to vaporize most of the moisture contained in said wet refuse, condensing said heating medium in said drying step to form condensate, and using the condensate for preheating boiler feed water.

3. A method of refuse incineration comprising the step of drying wet refuse before passing the latter to a boiler adapted to generate high-pressure superheated steam for producing mechanical work in an expander, wherein, in said drying step, the wet refuse is heated in a dryer by a heating medium in order to vaporize most of the moisture contained in said wet refuse, said boiler comprising a combustion chamber, an incoming refuse drying chamber, a drying gas return chamber, an air heating chamber for preheating air to be supplied to the boiler combustion chamber to support combustion therein, said four chambers being arranged vertically along said boiler, and a rotating burning grate disposed at the bottom of the boiler, introducing the refuse, after being heated in said dryer, into said boiler by passing through said drying chamber and falling onto said grate to be burned in the preheated air to generate a gaseous combustion product for heating a feed water heater, high-pressure steam generator and high-pressure superheated steam generator, which are connected in series and arranged in this order within said boiler at successively lower levels, and exiting said combustion product from said boiler as stack gas after passing the feed water heater, high-pressure steam heater and high-pressure superheated steam generator.

4. A method as claimed in claim 2, wherein said boiler comprises a combustion chamber, an incoming refuse drying chamber, a drying gas return chamber, and an air heating chamber for preheating air to be supplied to the boiler combustion chamber to support combustion therein, said four chambers being arranged vertically along said boiler.

5. A method as claimed in claim 4, wherein said boiler further comprises a rotating burning grate disposed at the bottom thereof.

6. A method as claimed in claim 4, wherein a plurality of downward inclined buffer plates are arranged within said drying chamber at different levels.

7. A method as claimed in claim 3, wherein said air to support combustion is preheated in a stack gas preheater disposed in a stack of said boiler and in an ash preheater disposed at the bottom of said boiler, and is then heated in a heater disposed in said burning gas heating chamber, before being introduced into the combustion chamber in the region of the burning grate for burning the refuse.

8. A method as claimed in claim 4, wherein at the top of said drying chamber a draft fan is provided.

9. A method as claimed in claim 4, wherein at the top of said burning gas heating chamber a draft fan is provided.

10. A method as claimed in claim 3, wherein said exiting stack gas is used for preheating the refuse before the latter is passed to said dryer.

* * * * *